United States Patent
Kons et al.

(10) Patent No.: US 12,387,046 B2
(45) Date of Patent: Aug. 12, 2025

(54) INTENT CLASSIFICATION ENHANCEMENT THROUGH TRAINING DATA AUGMENTATION

(71) Applicant: INTERNATIONAL BUSINESS MACHINES CORPORATION, Armonk, NY (US)

(72) Inventors: Zvi Kons, Yoqneam Ilit (IL); Aharon Satt, Kiryat Tivon (IL)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 17/643,224

(22) Filed: Dec. 8, 2021

(65) Prior Publication Data
US 2023/0177273 A1   Jun. 8, 2023

(51) Int. Cl.
*G06F 40/30* (2020.01)
*G06N 20/00* (2019.01)
*H04L 51/02* (2022.01)

(52) U.S. Cl.
CPC ............. *G06F 40/30* (2020.01); *G06N 20/00* (2019.01); *H04L 51/02* (2013.01)

(58) Field of Classification Search
CPC ........ G06F 40/30; G06N 20/00; G06N 3/006; H04L 51/02
See application file for complete search history.

(56) References Cited

U.S. PATENT DOCUMENTS

| | | | | |
|---|---|---|---|---|
| 10,289,792 | B1 * | 5/2019 | Chow | G06F 30/394 |
| 2006/0034212 | A1 * | 2/2006 | Mutch | H03M 7/30 |
| | | | | 370/328 |

(Continued)

FOREIGN PATENT DOCUMENTS

JP  2021524079 A  9/2021

OTHER PUBLICATIONS

Batista, "Automated Intent Classification Using Deep Learning," Search Engine Journal, Jun. 20, 2019, https://www.searchenginejournal.com/automated-intent-classification-using-deep-learning/311309/, 32 pages.

(Continued)

*Primary Examiner* — Bhavesh M Mehta
*Assistant Examiner* — Paul J. Mueller
(74) *Attorney, Agent, or Firm* — Lily Neff

(57) ABSTRACT

A computer-implemented method, a computer system and a computer program product enhance an intent classifier through training data augmentation. The method includes selecting a target sample from a plurality of samples. The method also includes determining an ambiguity level for the target sample based on confidence scores of at least two intent labels associated with the target sample. The method further includes selecting a nearest neighboring sample from a group of neighboring samples when the ambiguity level is below a threshold. The nearest neighboring sample includes a confidence score associated with an intent label. The method also includes, for every intent label, merging the confidence scores of the two samples into an overall confidence score for the intent label and modifying the ambiguity level using the overall confidence score. Lastly, the method includes labeling the target sample with the intent label when the modified ambiguity level is above the threshold.

17 Claims, 4 Drawing Sheets

(56) References Cited

U.S. PATENT DOCUMENTS

| | | | | |
|---|---|---|---|---|
| 2009/0241197 | A1* | 9/2009 | Troyansky | H04L 63/145 |
| | | | | 726/26 |
| 2014/0365494 | A1* | 12/2014 | Gangavaram | G06F 16/245 |
| | | | | 707/739 |
| 2017/0048185 | A1* | 2/2017 | Krueger | H04L 51/52 |
| 2018/0260680 | A1* | 9/2018 | Finkelstein | G06N 5/04 |
| 2020/0184957 | A1* | 6/2020 | Asumu | G06N 7/01 |
| 2021/0303784 | A1* | 9/2021 | Brdiczka | G06F 40/35 |
| 2022/0245161 | A1* | 8/2022 | Ahmed | G06F 16/24578 |
| 2022/0284451 | A1* | 9/2022 | Xu | G06F 16/2477 |

OTHER PUBLICATIONS

Dopierre et al., "Few-shot Pseudo-Labeling for Intent Detection," Proceedings of the 28th International Conference on Computational Linguistics, Dec. 8-13, 2020, https://aclanthology.org/2020.coling-main.438.pdf, pp. 4993-5003.

Lin et al., "Discovering New Intents via Constrained Deep Adaptive Clustering with Cluster Refinement," Proceedings of the AAAI Conference on Artificial Intelligence, 34(05), 2020, https://doi.org/10.1609/aaai.v34i05.6353, pp. 8360-8367.

Mell et al., "The NIST Definition of Cloud Computing", National Institute of Standards and Technology, Special Publication 800-145, Sep. 2011, 7 pages.

Nigam, "Using Unlabeled Data to Improve Text Classification," Thesis, Carnegie Mellon University, School of Computer Science, May 2001, https://citeseerx.ist.psu.edu/viewdoc/download?doi=10.1.1.993.7155&rep=rep1&type=pdf, 139 pages.

Zhang et al., "An Ensemble Deep Active Learning Method for Intent Classification," CSAI2019, Dec. 6-8, 2019, ACM, DOI: https://doi.org/10.1145/3374587.3374611, pp. 107-111.

* cited by examiner

INTENT CLASSIFICATION ENHANCEMENT THROUGH TRAINING DATA AUGMENTATION

BACKGROUND

Embodiments relate generally to the field of natural language processing, and in particular to augmenting data for use in training a natural language intent classifier.

Chatbots, talkbots, instant messaging bots, artificial conversational entities, and the like, e.g., chatbots, are software applications designed to simulate natural language communication, conversation, and dialogue with humans and end-users. To facilitate these interactions, the chatbot may need to understand, interpret, and determine an expressed intent of an end-user and may generate desired outputs by correctly determining expressed intents of end-users.

The chatbot may determine an expressed intent by implementing a natural language classifier to disambiguate, understand, and interpret the expressed intent, where the expressed intent may include, for example, free-form text and/or transcriptions of spoken utterances. Such a classifier may be trained by providing a set of text examples for each intent, where the classifier may try to match a new text sample to the known examples and intents to figure out which intent is the best match for the new sample. More examples may be added to the training data, with the goal of increasing the accuracy of the natural language classifier to identify intent and therefore, the performance and effectiveness of the chatbot.

SUMMARY

An embodiment is directed to a computer-implemented method for enhancing an intent classifier through training data augmentation. The method may include selecting a target sample from a plurality of samples. Each target sample may include at least two intent labels and a first confidence score associated with each intent label. The method may also include determining an ambiguity level for the target sample based on the at least two intent labels and the associated first confidence scores. The method may further include selecting a nearest neighboring sample from a group of neighboring samples when the ambiguity level is below a threshold. The nearest neighboring sample may include a second confidence score associated with a neighbor intent label. In addition, the method may include merging the first and second confidence scores into a third confidence score associated with the intent label for every intent label matching the neighbor intent label. The method may also include generating a modified ambiguity level based on the third confidence score. Lastly, the method may include labeling the target sample with the intent label when the modified ambiguity level is above the threshold.

In an embodiment, the method may include determining a semantic distance from the target sample to each of the plurality of samples and associating the semantic distance with a respective sample. In this embodiment, the method may also include adding the respective sample to the group of neighboring samples when the semantic distance from the target sample to the respective sample is less than or equal to a maximum semantic distance from the target sample.

In an embodiment, the method may include determining whether a sample in the group of neighboring samples has been selected as the nearest neighboring sample when the modified ambiguity level is below the threshold. In this embodiment, the method may also include selecting the sample as the nearest neighboring sample when the sample has not been selected as the nearest neighboring sample.

In an embodiment, the nearest neighboring sample may be the respective sample associated with a lowest semantic distance from the target sample to the respective sample.

In an embodiment, determining the ambiguity level may include identifying the first confidence score associated with each of the at least two intent labels and calculating a difference between a highest first confidence score and a next highest first confidence score.

In an embodiment, merging the first and second confidence scores into the third confidence score may include calculating a weight based on the semantic distance from the target sample to the nearest neighboring sample and applying the weight to an average of the first and second confidence scores.

In an embodiment, generating the modified ambiguity level may include identifying the third confidence score associated with each intent label and calculating a difference between a highest third confidence score and a next highest third confidence score.

In addition to a computer-implemented method, additional embodiments are directed to a computer system and a computer program product for enhancing an intent classifier through training data augmentation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
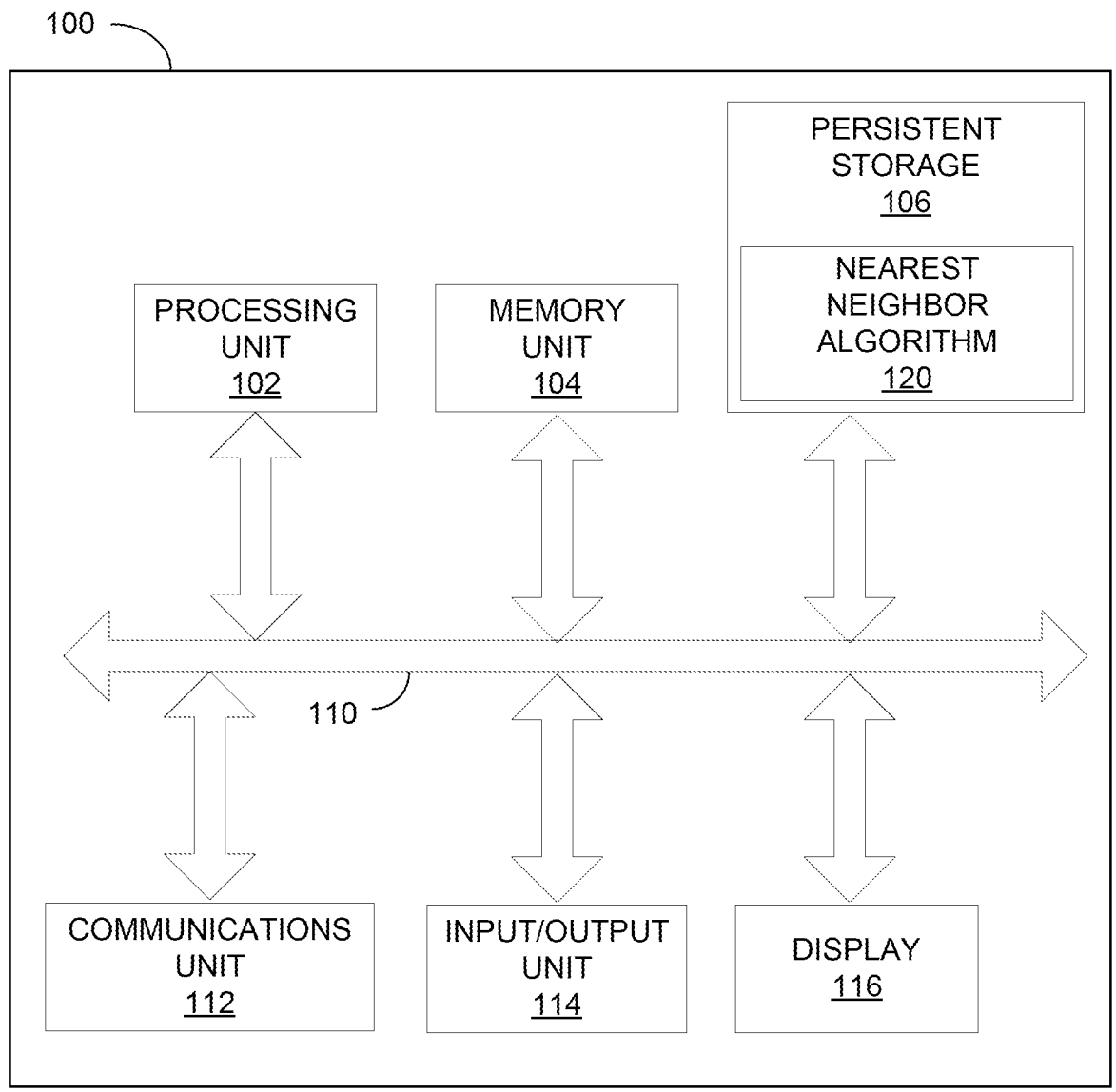
FIG. 1 depicts a block diagram of an example computer system in which various embodiments may be implemented.

The performance and effectiveness of a chatbot may depend on the natural language comprehension by and of which the chatbot may determine, such as through a natural language classifier, variously expressed intents. Higher and more granular levels of understanding and interpretation may allow for more accurate determinations to be made, enabling better performance by the chatbot in meaningfully communicating with end-users.

For example, user inputs from end-users including requests, phrases, or questions such as "I want to change the password of my system," "I forgot the password of my system, can you send it to me?," and "I lost the password. How can I recover it?" express similar but distinct intents having slightly varying requirements. A limited understanding or a coarse interpretation of the expressed intents may reduce the usefulness and utility of a chatbot, causing the chatbot to determine each of the intents as relating only to "password," thereby reducing the chatbot's ability to support and facilitate natural language communications with end-users. As such, outputs produced by the chatbot with respect to the user inputs may be less meaningful, helpful, and desirable, and may only be partially relevant with respect to compatibly expressed intents. An increase in the limits of understanding, or a fine-tuning of interpretation, of the expressed intents may increase the usefulness and utility of a chatbot, enabling the chatbot to determine each of the intents as relating to "password_change," "password_e-mail_ recovery," and/or "password_recovery," respectively, thereby increasing the chatbot's ability to support and facilitate natural language communications with end-users. As such, outputs produced by the chatbot with respect to the user inputs may be more meaningful, helpful, and desirable, and may be sufficiently relevant to variously expressed intents.

A degree of natural language comprehension by and of a natural language classifier (NLC) may be developed based on carefully prepared and curated training data. The training data may include, for example, data objects based on texts and/or speech of corpora corresponding to historical or representative expressed intents. The training data may be prepared to include, for example, classifications of the expressed intents associating individual expressions of the corpora to corresponding classes or categories of intents related to natural language usage in a domain in which the NLC may be applied. The NLC may perform a "training" stage in which learning models learn natural language rules based on the training data to develop a machine representation model for enabling the natural language comprehension by and of the NLC. As such, there may be hundreds or even thousands of training data samples available to a classifier, all of which must be classified according to intent.

As a classifier learns the intent of various training data samples, there may be ambiguity in how the data is classified. The classifier may detect multiple intents for a single training data sample and assign a confidence score to each of the intents indicating the likelihood that it believes that intent is correct for the training data sample. In the example of the password above, all three intents may be assigned to all the statements, with a varying degree of confidence indicated by a score and the intents ranked by confidence score. In addition to a confidence score for each intent, an ambiguity level may be defined for each training data sample from the confidence scores. This ambiguity level may be the difference between the highest and the second-highest confidence scores, which may show how clearly the intent may have been recognized by the classifier. If a training data sample has one clear intent, it may have a confidence score that is much greater than for other intents, and therefore the difference between the top confidence score and the remaining confidence scores may be large. However, for a high-ambiguity sample, this difference may be low, and assistance may be needed to clear up the actual intent of the training data sample.

Once a classifier is up and running, logs may be collected with conversation details that may be examined by a human to identify inputs that may not be classified correctly and manually add them as new examples to the correct intent. However, the large amount of data that may be collected makes this a very long and laborious process but at the same time, fully automatic methods may not be reliable and therefore lead to degradation of the accuracy of the system.

It may be advantageous to use the original classifier to extract a subset of training data samples with high ambiguity which can be added as examples to the classifier and improve its accuracy. The accuracy of the labeling for these samples is low and may be improved by examining the cluster of nearest neighbor text samples around the original text and merging the output of the classifier from other text samples in the cluster. With this process, the accuracy and reliability of the intent classifier may be improved. Such a method may improve the process of training an intent classifier by working with existing data, rather than collecting new data, and may also increase the efficiency and processing speed of an artificial intelligence system to train an intent classifier.

Referring now to FIG. 1, there is shown a block diagram illustrating a computer system 100 in accordance with an embodiment. It should be appreciated that FIG. 1 provides only an illustration of one implementation and does not imply any limitations with regard to the environments in which different embodiments may be implemented. Many modifications to the depicted environments may be made based on design and implementation requirements. For example, computer system 100 may be implemented in hardware only, software only, or a combination of both hardware and software. Computer system 100 may have more or fewer components and modules than shown, may combine two or more of the components, or may have a different configuration or arrangement of the components. Computer system 100 may include any additional component enabling it to function as an operable computer system, such as a motherboard, data busses, power supply, a network interface card, a display, an input device (e.g., keyboard, pointing device, touch-sensitive display), etc. (not shown). Moreover, components of computer system 100 may be co-located or distributed, or the system could run as one or more cloud computing "instances," "containers," and/or "virtual machines," as known in the art.

As shown, a computer system 100 includes a processor unit 102, a memory unit 104, a persistent storage 106, a communications unit 112, an input/output unit 114, a display 116, and a system bus 110. Computer programs such as 120 may be stored in the persistent storage 106 until they are needed for execution, at which time the programs are brought into the memory unit 104 so that they can be directly accessed by the processor unit 102. The processor unit 102 selects a part of memory unit 104 to read and/or write by using an address that the processor unit 102 gives to memory unit 104 along with a request to read and/or write. Usually, the reading and interpretation of an encoded instruction at an address causes the processor unit 102 to fetch a subsequent instruction, either at a subsequent address or some other address. The processor unit 102, memory unit 104, persistent storage 106, communications unit 112, input/output unit 114, and display 116 all interface with each other through the system bus 110.

Examples of computing systems, environments, and/or configurations that may be represented by the computer system 100 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Each computing system 100 may also include a communications unit 112 such as TCP/IP adapter cards, wireless Wi-Fi interface cards, or 3G or 4G wireless interface cards or other wired or wireless communication links. Communication between mobile devices may be accomplished via a network and respective network adapters or communication units 112. In such an instance, the communication network may be any type of network configured to provide for data or any other type of electronic communication. For example, the network may include a local area network (LAN), a wide area network (WAN), a virtual private network (VPN), a mobile or cellular telephone network, the Internet, or any other electronic communication system. The network may use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computer system 100 may be used for processing training data samples that a supervised machine learning classification model (known herein as an "intent classifier") may have already attempted to process. For example, in the example described above, a text conversation of a user in a support session may result in multiple possible intents returned by the classifier, each with a confidence score indicating the classifier's confidence in the result. In this scenario, the nearest neighbor algorithm 120 may process the data sample as described herein, along with other samples within the training data to attempt to augment the data. One of ordinary skill in the art will recognize that the training data may take any form that allows an intent classifier to determine what a human intends by what is said in the conversation captured as a training data sample.

Figure 2:
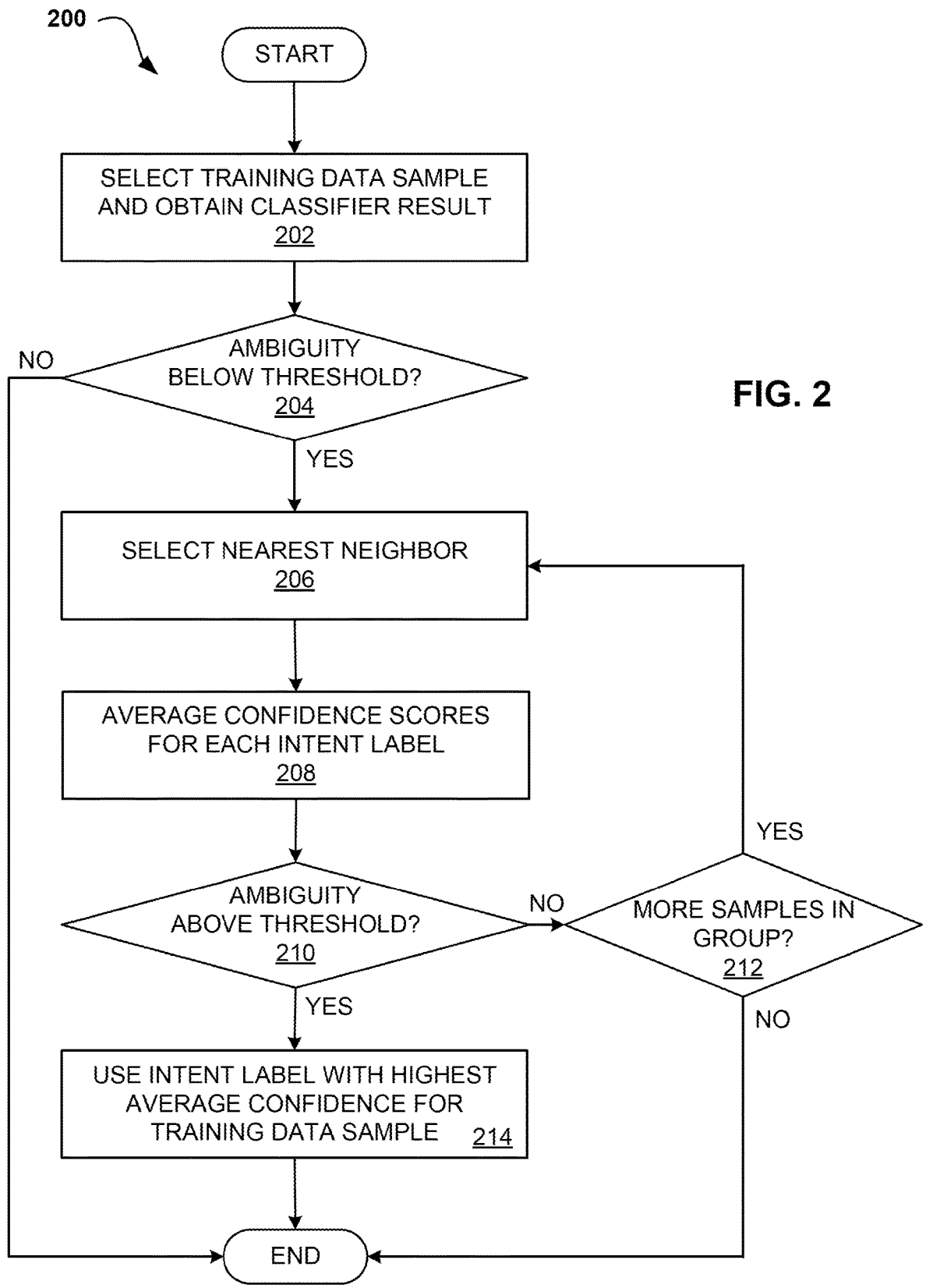
FIG. 2 depicts a flow chart diagram of a process for enhancing an intent classifier through training data augmentation in accordance with one or more embodiments.

Referring to FIG. 2, an operational flowchart illustrating a process 200 for enhancing an intent classifier through training data augmentation is depicted according to at least one embodiment. At 202, a target sample may be identified and obtained from the training data and the results of the intent classifier may be obtained for the sample, which may include multiple intents and a confidence score assigned to each intent. For example, in the example above, each of the phrases "I want to change the password of my system," "I forgot the password of my system, can you send it to me?", and "I lost the password. How can I recover it?" may result in multiple intents being detected by the classifier. Possible intent labels, as mentioned above, may be "password_change," "password_email_recovery," and "password_recovery." The intent classifier may indicate confidence in the resulting classification, and by extension an ambiguity of its results, by assigning a confidence score that may be associated with the intent label. A high confidence score may indicate a high level of confidence and, as a result, the intent label with the highest confidence score may be the intent label that the classifier initially uses for the sample. The results of the classification process, or the possible intent labels that may be selected by the classifier, may be ranked by the confidence score and the scores associated with the intent labels returned for the sample such that the highest ranked intent label and the next highest ranked intent label may be identified.

At 204, an ambiguity function may be determined that may be defined as the difference between the highest confidence score associated with an intent label and the next highest confidence score associated with an intent label. The ambiguity function may define the usefulness of the sample in improving the intent classifier. For example, low-ambiguity samples (those samples with high ambiguity function values) may be defined as a sample with a confidence score for one of the labels that is much higher than all the others and therefore a larger difference between the highest confidence score and the next highest score. This situation typically indicates that the classifier is confident about its results and these samples are likely to have a correct labeling. However, high-ambiguity samples may be defined as those samples with low ambiguity function values, where the difference between the confidence score for the top intent label and at least one of the others is small, which may indicate that these samples are more likely to have been misclassified and an analysis of the labels and confidence scores may be useful in improving the intent classifier. Therefore, only those target samples with small enough ambiguity function values, or the smallest difference between the highest and next highest confidence scores, need further processing. A threshold value for the ambiguity function may be predefined or may be manually set by a user such that the value may be different for different sets of samples. A target sample with an ambiguity level below the threshold value may proceed to step 206, while processing would end for low-ambiguity samples that have a higher difference in confidence scores.

At 206, a nearest neighboring sample to the target sample obtained in 202 may be determined. A nearest neighboring sample may be defined as the sample that is most semantically similar to the target sample and may use a distance function that may be defined for the purpose of calculating a semantic distance, which may be defined as a measure of how close or distant two phrases are in terms of their meaning. As an example, "ballet" and "dance" may be seen as very close in meaning and have a small semantic distance, while "clown" and "bridge" may be further apart in meaning and have a large semantic distance. One of ordinary skill in the art may recognize that there are many ways to calculate semantic distance to identify samples that may be sufficiently related to the target sample. A distance function that may be applied to the body of training data may measure the semantic distance from the target sample to each sample in the training data and associate the semantic distance that may be calculated with the sample. The distance function results may be sorted and ranked by the semantic distance and a maximum distance from the target sample, or "radius" in the context of a circle that may be drawn with the target sample at the center, may be defined and applied to the results. Any samples with a semantic distance equal to or less than the maximum distance may be grouped and ordered by distance as possible selections for the nearest neighboring sample. All samples within this group may eventually be processed but only one sample within the group may be the nearest neighboring sample at any time.

At 208, just as with the target sample, the results of the intent classifier for the nearest neighboring sample may be obtained and the intent labels contained within the results may be compared to the target sample. A new confidence score may be calculated for each intent label, where the average may be taken of all the confidence scores for a specific intent label from the target samples and all the nearest neighbors' samples process so far and a zero score may be used when the intent labels do not match between samples. This new confidence score may be used to modify the ambiguity level and determine if improvement in the labeling of the target sample may be possible. While a simple average of the two confidence scores may be done, a weighted average may also be calculated, where a weight may be applied to the confidence scores of the nearest neighboring sample that may be based on the semantic distance between the samples as samples that may have a greater similarity to each other or have a smaller semantic distance between the original sample and the nearest neighbor may be more useful than those that are less similar. At the same time, the weight may also be based on a rank of the confidence score within the intent labels of either sample, as the classifier's confidence in the classification of either sample may be useful in determining how to use the results in determining the intent label that should be used for the original sample. One of ordinary skill in the art may recognize many ways to apply weights to the confidence scores for the purpose of a weighted average.

At 210, the ambiguity level may be modified based on the difference between the new confidence score for the highest-ranked intent label of the target sample and the second-highest intent label of the target sample. It is important to note that the nearest neighboring sample may have different rankings of intent labels by confidence score and while the rankings of the target sample may be used in the analysis and calculation of ambiguity level in 204, the averaging process may result in modified rankings and, therefore, different intent labels associated with the highest and next highest rankings. For example, as described in 202, the target sample may have certain intent labels returned with associated confidence scores. If one of the other two samples is the nearest neighboring sample, that sample is only checked to see if the sample contains intent labels that match the target sample and, if so, the confidence score may be averaged with the confidence score of the target sample for that intent label regardless of its ranking within the intent labels of the nearest neighboring sample. It is not required only that the intent labels of the target sample and the nearest neighboring sample match in performing the averaging process.

The modified ambiguity level may again be compared to a threshold value and if the ambiguity level is now above this threshold value, then this may indicate that the sample should be classified with the intent label associated with the highest ranked confidence score used in the ambiguity level calculation. However, if the ambiguity level is still below the threshold value, then more samples within the group of possible nearest neighboring selections may need to be checked or the process may end.

At 212, it may be determined whether there are more samples within the group of possible nearest neighbor selections that should be checked, in which case the process may return to 206 for addition of a new nearest neighboring sample. If there are no more samples within the group of possible nearest neighboring selections, then the process may end.

At 214, the target sample may be classified with the intent label that is associated with the highest ranked confidence score. Because the averaging process of 208 may modify the confidence score of all matching intent labels, it is not required that this intent label be the same as the intent label associated with the initial confidence score that may have been the highest ranked.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
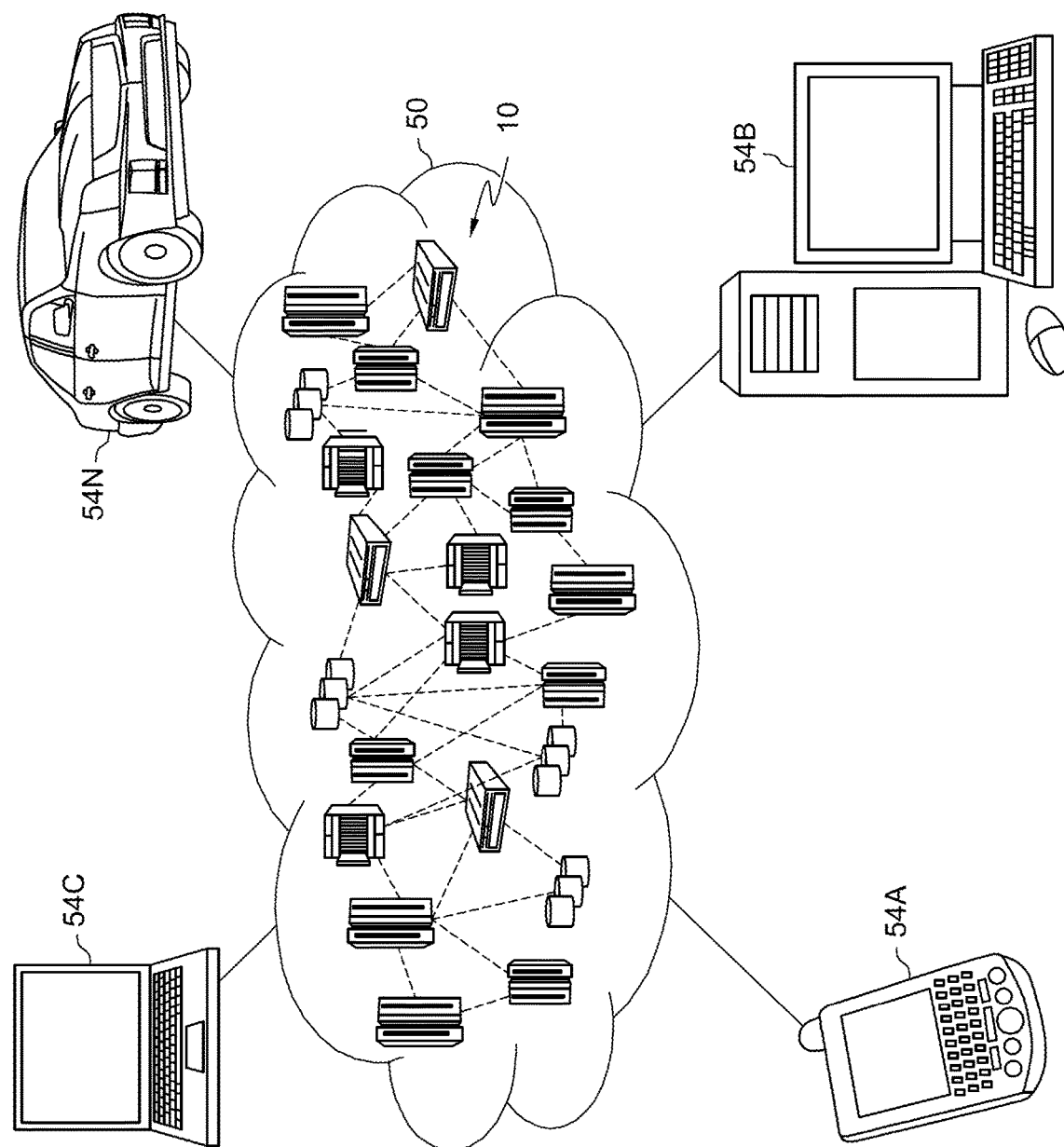
FIG. 3 depicts a cloud computing environment according to an embodiment.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
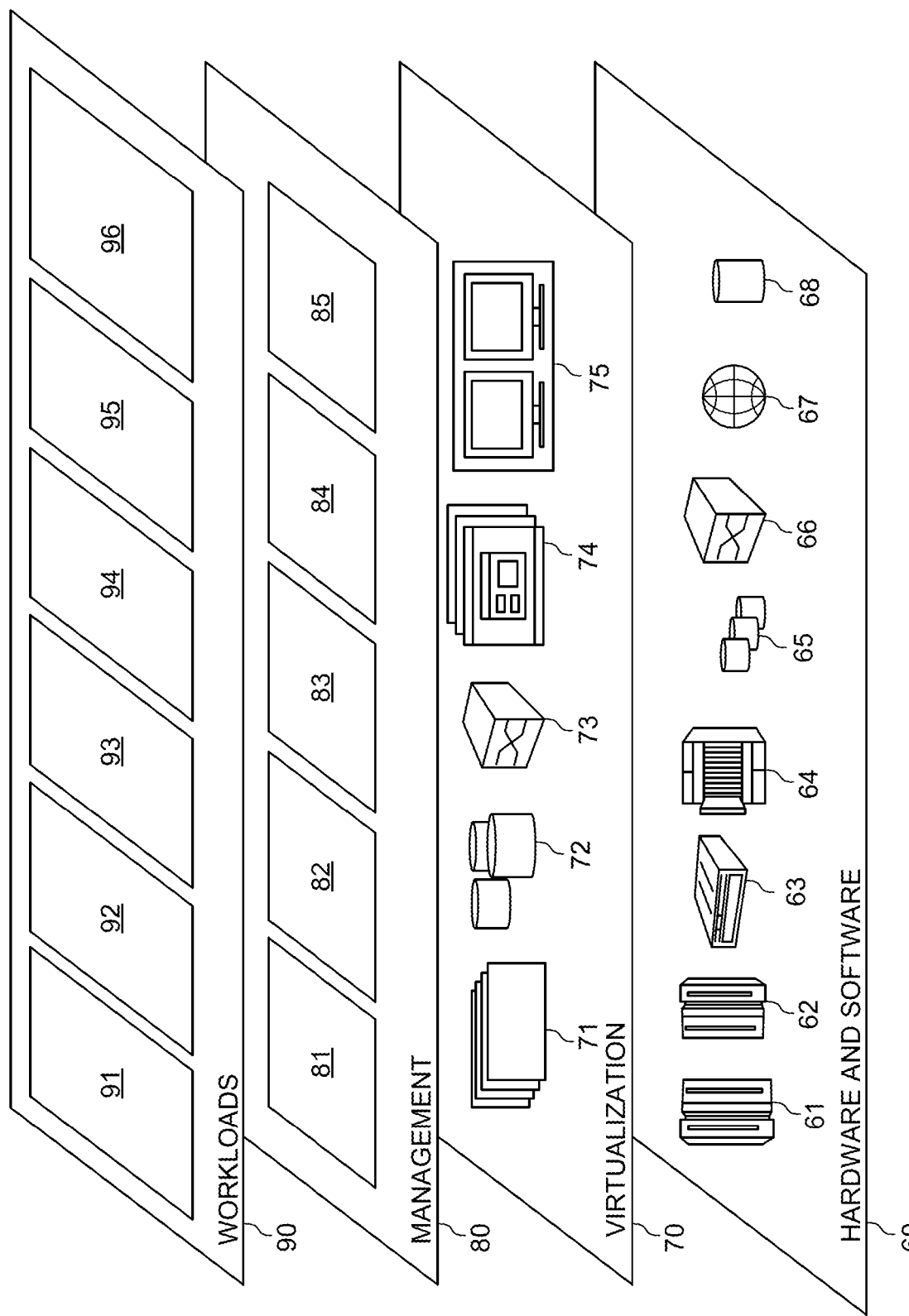
FIG. 4 depicts abstraction model layers according to an embodiment.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66, such as a load balancer. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and the nearest neighbor algorithm 96. The nearest neighbor algorithm may refer to a method of augmenting the labeling of training data in an intent classification setting.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating training data, comprising: selecting a target sample from a volume of samples, wherein each target sample can have a plurality of training data samples to train a classifier to automatically use the training data by using the plurality of training data samples to detect a plurality of intents for each of the training data samples; generating a classifier label for each of the plurality of intents so that each target sample includes at least two intent labels; assigning a confidence score to each of the plurality of intents so as to determine which of the plurality of intents indicate a likelihood of being a correct interpretation; ranking said confidence scores according to their score value and determining an ambiguity level associated with each data sample from said confidence scores, wherein said ambiguity level is a difference between a highest and a second-highest confidence scores; using ranked confidence scores and the ambiguity level to train said classifier; selecting a nearest neighboring sample from a group of neighboring samples when the ambiguity level is below a threshold, wherein the nearest neighboring sample includes a second confidence score associated with a neighbor intent label; merging a first and second confidence scores into a third confidence score associated with the intent label for every intent label matching the neighbor intent label; generating a cluster sample of similar classifier labels and selecting the nearest neighboring sample from the group of neighboring samples when the ambiguity level remain below the threshold, wherein the nearest neighboring sample includes a second confidence score associated with a neighbor classifier label, wherein neighboring distances are determined according to determining a semantic distance from the target sample to each of the plurality of training data samples and associating the semantic distance with a respective sample; updating the confidence score based on changes made to reflect changes in ambiguity levels dynamically, wherein the updating is based on a difference between a new confidence score for a highest-ranked classifier label of the target sample and a second-highest classifier label of the target sample and a calculation of ambiguity level in each case so that said averaging process is used to modify an ambiguity and confidence score rankings; labeling the target sample with a new intent associated classifier label when the modified ambiguity level is above the threshold; and updating the confidence score and including the changes made to the ambiguity level and the confidence score each time they are updated for training the classifier.

2. The computer-implemented method of claim 1, further comprising:
adding the respective sample to the group of neighboring samples when the semantic distance from the target sample to the respective sample is less than or equal to a maximum distance from the target sample.

3. The computer-implemented method of claim 1, further comprising: determining whether a sample in the group of neighboring samples has been selected as the nearest neighboring sample when the modified ambiguity level is below the threshold; and selecting the sample as the nearest neighboring sample when the sample has not been selected as the nearest neighboring sample.

4. The computer-implemented method of claim 2, wherein the nearest neighboring sample is the respective sample associated with a lowest semantic distance from the target sample to the respective sample.

5. The computer-implemented method of claim 1, wherein determining the ambiguity level comprises: identifying each confidence score associated with each of the at least two target intent labels; and calculating a difference between a highest first confidence score and a next highest first confidence score.

6. The computer-implemented method of claim 2, further comprising:
calculating a weight based on the semantic distance from the target sample to the nearest neighboring sample; and applying the weight to provide an average of confidence scores.

7. A computer system for generating training data, comprising: one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising: selecting a target sample from a volume of samples, wherein each target sample can have a plurality of training data samples to train a classifier to automatically use the training data by using the plurality of training data samples to detect a plurality of intents for each of the training data samples; generating a classifier label for each of the plurality of intents so that each target sample includes at least two intent labels; assigning a confidence score to each of the plurality of intents so as to determine which of the plurality of intents indicate a likelihood of being a correct interpretation; ranking said confidence scores according to their score value and determining an ambiguity level associated with each data sample from said confidence scores, wherein said ambiguity level is a difference between a highest and a second-highest confidence scores; using ranked confidence scores and the ambiguity level to train said classifier; selecting a nearest neighboring sample from a group of neighboring samples when the ambiguity level is below a threshold, wherein the nearest neighboring sample includes a second confidence score associated with a neighbor intent label; merging a first and second confidence scores into a third confidence score associated with the intent label for every intent label matching the neighbor intent label; generating a cluster sample of similar classifier labels and selecting the nearest neighboring sample from the group of neighboring samples when the ambiguity level remain below the threshold, wherein the nearest neighboring sample includes a second confidence score associated with a neighbor classifier label, wherein neighboring distances are determined according to determining a semantic distance from the target sample to each of the plurality of training data samples and associating the semantic distance with a respective sample; updating the confidence score based on changes made to reflect changes in ambiguity levels dynamically, wherein the updating is based on a difference between a new confidence score for a highest-ranked classifier label of the target sample and a second-highest classifier label of the target sample and a calculation of ambiguity level in each case so that said averaging process is used to modify an ambiguity and confidence score rankings; labeling the target sample with a new intent associated classifier label when the modified ambiguity level is above the threshold; and updating the confidence score and including the changes made to the ambiguity level and the confidence score each time they are updated for training the classifier.

8. The computer system of claim 7, further comprising: adding the respective sample to the group of neighboring samples when the semantic distance from the target sample to the respective sample is less than or equal to a maximum distance from the target sample.

9. The computer system of claim 7, further comprising: determining a semantic distance from the target sample to each of the plurality of samples and associating the semantic distance with the respective sample; and adding the respective sample to the group of neighboring samples when the semantic distance from the target sample to the respective sample is less than or equal to a maximum distance from the target sample.

10. The computer system of claim 8, wherein the nearest neighboring sample is the respective sample associated with a lowest semantic distance from the target sample to the respective sample.

11. The computer system of claim 7, wherein determining the ambiguity level comprises: identifying each confidence score associated with each of the at least two target intent labels; and calculating a difference between a highest first confidence score and a next highest first confidence score.

12. The computer system of claim 8, further comprising: calculating a weight based on the semantic distance from the target sample to the nearest neighboring sample; and applying the weight to provide an average of confidence scores.

13. A computer program product for generating training data, comprising:
a non-transitory computer-readable storage device storing computer-readable program code embodied therewith, the computer-readable program code comprising program code executable by a computer to perform a method comprising: selecting a target sample from a volume of samples, wherein each target sample can have a plurality of training data samples to train a classifier to automatically use the training data by using the plurality of training data samples to detect a plurality of intents for each of the training data samples; generating a classifier label for each of the plurality of intents so that each target sample includes at least two intent labels; assigning a confidence score to each of the plurality of intents so as to determine which of the plurality of intents indicate a likelihood of being a correct interpretation; ranking said confidence scores according to their score value and determining an ambiguity level associated with each data sample from said confidence scores, wherein said ambiguity level is a difference between a highest and a second-highest confidence scores; using ranked confidence scores and the ambiguity level to train said classifier; selecting a nearest neighboring sample from a group of neighboring samples when the ambiguity level is below a threshold, wherein the nearest neighboring sample includes a second confidence score associated with a neighbor intent label; merging a first and second confidence scores into a third confidence score associated with the intent label for every intent label matching the neighbor intent label; generating a cluster sample of similar classifier labels and selecting the nearest neighboring sample from the group of neighboring samples when the ambiguity level remain below the threshold, wherein the nearest neighboring sample includes a second confidence score associated with a neighbor classifier label, wherein neighboring distances are determined according to determining a semantic distance from the target sample to each of the plurality of training data samples and associating the semantic distance with a respective sample; updating the confidence score based on changes made to reflect changes in ambiguity levels dynamically, wherein the updating is based on a difference between a new confidence score for a highest-ranked classifier label of the target sample and a second-highest classifier label of the target sample and a calculation of ambiguity level in each case so that said averaging process is used to modify an ambiguity and confidence score rankings; labeling the target sample with a new intent associated classifier label when the modified ambiguity level is above the threshold; and updating the confidence score and including the changes made to the ambiguity level and the confidence score each time they are updated for training the classifier.

14. The computer program product of claim 13, further comprising:
  adding the respective sample to the group of neighboring samples when the semantic distance from the target sample to the respective sample is less than or equal to a maximum distance from the target sample.

15. The computer program product of claim 14, further comprising: determining whether a sample in the group of neighboring samples has been selected as the nearest neighboring sample when the modified ambiguity level is below the threshold; and selecting the sample as the nearest neighboring sample when the sample has not been selected as the nearest neighboring sample.

16. The computer program product of claim 13, wherein determining the ambiguity level comprises: identifying each confidence score associated with each of the at least two target intent labels; and calculating a difference between a highest first confidence score and a next highest first confidence score.

17. The computer program product of claim 14, further comprising:
  calculating a weight based on the semantic distance from the target sample to the nearest neighboring sample; and applying the weight to provide an average of confidence scores.

* * * * *